(12) United States Patent
Nishimori et al.

(10) Patent No.: US 11,904,973 B2
(45) Date of Patent: Feb. 20, 2024

(54) MOTOR UNIT AND ELECTRIC BICYCLE

(71) Applicant: Panasonic Intellectual Property Management Co., Ltd., Osaka (JP)

(72) Inventors: Masato Nishimori, Hyogo (JP); Fuhito Umegaki, Osaka (JP); Takehiro Yamaguchi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 803 days.

(21) Appl. No.: 16/979,254

(22) PCT Filed: Mar. 5, 2019

(86) PCT No.: PCT/JP2019/008625
§ 371 (c)(1),
(2) Date: Sep. 9, 2020

(87) PCT Pub. No.: WO2019/176649
PCT Pub. Date: Sep. 19, 2019

(65) Prior Publication Data
US 2020/0398929 A1 Dec. 24, 2020

(30) Foreign Application Priority Data

Mar. 13, 2018 (JP) ................................ 2018-046040

(51) Int. Cl.
*B62M 6/50* (2010.01)
*B62J 45/412* (2020.01)
(Continued)

(52) U.S. Cl.
CPC ........... *B62J 45/421* (2020.02); *B62J 45/411* (2020.02); *B62J 45/412* (2020.02); *B62M 6/50* (2013.01);
(Continued)

(58) Field of Classification Search
CPC ....... B62M 6/50; H02K 11/215; H02K 7/083; H02K 7/116; H02K 21/14
See application file for complete search history.

(56) References Cited

U.S. PATENT DOCUMENTS

2005/0177285 A1* 8/2005 Honda ..................... B62M 7/12
180/220
2013/0015748 A1 1/2013 Takei et al.
(Continued)

FOREIGN PATENT DOCUMENTS

CN 102207367 A * 10/2011 .............. B60L 50/20
CN 102882317 A 1/2013
(Continued)

OTHER PUBLICATIONS

International Search Report for corresponding Application No. PCT/JP2019/008625, dated Apr. 23, 2019.
(Continued)

*Primary Examiner* — Jacob D Knutson
(74) *Attorney, Agent, or Firm* — Renner, Otto, Boisselle & Sklar, LLP

(57) ABSTRACT

A rotary shaft includes a projection protruding from a rotor along an axial direction of the rotary shaft. The projection has an outer peripheral surface provided with teeth engaged with a gear. The rotor has a first portion which is located around the rotary shaft and which is fixed to the rotary shaft. The rotor has a second portion which is located at an end of the rotor, the end facing the projection. The second portion has an inner diameter larger than an inner diameter of the first portion.

10 Claims, 6 Drawing Sheets

(51) Int. Cl.
    *B62J 45/421*     (2020.01)
    *H02K 11/215*     (2016.01)
    *B62M 6/55*     (2010.01)
    *H02K 7/08*     (2006.01)
    *H02K 7/116*     (2006.01)
    *H02K 21/14*     (2006.01)
    *B62J 45/411*     (2020.01)
    *B62J 43/13*     (2020.01)

(52) U.S. Cl.
    CPC ............... *B62M 6/55* (2013.01); *H02K 7/083* (2013.01); *H02K 7/116* (2013.01); *H02K 11/215* (2016.01); *H02K 21/14* (2013.01); *B62J 43/13* (2020.02)

(56) References Cited

U.S. PATENT DOCUMENTS

| | | | |
|---|---|---|---|
| 2014/0076650 A1* | 3/2014 | Kim | B62K 3/10 180/220 |
| 2017/0313383 A1 | 11/2017 | Uda et al. | |
| 2018/0062479 A1 | 3/2018 | Stewart | |

FOREIGN PATENT DOCUMENTS

| | | | | |
|---|---|---|---|---|
| CN | 107336789 A | | 11/2017 | |
| CN | 107336790 A | * | 11/2017 | ............ B62M 11/02 |
| EP | 2381566 A2 | | 10/2011 | |
| EP | 2998211 A1 | | 3/2016 | |
| EP | 3287355 A1 | | 2/2018 | |
| JP | S63-117273 U | | 7/1988 | |
| JP | 08223889 A | * | 8/1996 | |
| JP | H08-223889 A | | 8/1996 | |
| JP | 2003-319631 A | | 11/2003 | |
| JP | 2005-168264 A | | 6/2005 | |
| JP | 2007-274872 A | | 10/2007 | |
| JP | 2008115896 A | * | 5/2008 | ........... H02K 11/215 |
| JP | 2011-207361 A | | 10/2011 | |
| JP | 2016-093009 A | | 5/2016 | |
| JP | 2016-203735 A | | 12/2016 | |
| KR | 20130016952 A | * | 2/2013 | ............... F16H 3/00 |
| WO | 2014/184826 A1 | | 11/2014 | |
| WO | 2018/039343 A1 | | 3/2018 | |

OTHER PUBLICATIONS

Written Opinion for corresponding Application No. PCT/JP2019/008625, dated Apr. 23, 2019.

Office Action for corresponding Chinese Patent Application 201980018389.3 dated Aug. 25, 2022 with English Translation.

* cited by examiner

LEFTWARD ←→ RIGHTWARD

LEFTWARD ←→ RIGHTWARD

MOTOR UNIT AND ELECTRIC BICYCLE

TECHNICAL FIELD

The present invention relates to motor units and electric bicycles and specifically, to a motor unit including a motor and a gear mechanism and an electric bicycle including the motor unit.

BACKGROUND ART

Patent Literature 1 discloses an electrically assisted bicycle including a motor drive unit. The motor drive unit includes a motor configured to generate auxiliary driving force. A motor includes a rotor and a rotary shaft. The rotary shaft has a protruding part protruding from the rotor along an axial direction of the rotary shaft. The protruding part has a toothing part. The motor drive unit further includes a deceleration mechanism. The deceleration mechanism includes a reduction gear, and the reduction gear is engaged with the toothing part.

The rotary shaft is long because the protruding part of the rotary shaft has part on which the toothing part is formed, which may increase the size of the motor drive unit in the axial direction.

CITATION LIST

Patent Literature

Patent Literature 1: WO 2014/184826 A1

SUMMARY OF INVENTION

In view of the foregoing, it is an object of the present invention to provide a motor unit whose size is suppressed from being increased in an axial direction of a rotary shaft of the motor unit and an electric bicycle equipped with the motor unit.

A motor unit according to one aspect of the present invention has the following configuration. The motor unit includes a motor and a gear. The motor includes a rotary shaft, a rotor, and a stator. The stator is configured to rotate the rotor. The rotary shaft has a projection. The projection protrudes from the rotor along an axial direction of the rotary shaft. The motor further has teeth. The teeth are formed on an outer peripheral surface of the projection and are engaged with the gear. The rotor has a first portion and a second portion. The first portion is located around the rotary shaft and is fixed to the rotary shaft. The second portion is located at an end of the rotor, the end facing the projection. The second portion has an inner diameter larger than an inner diameter of the first portion.

Moreover, an electric bicycle according to one aspect of the present invention has the following configuration. The electric bicycle includes the motor unit and a wheel to which driving force of the motor included in the motor unit is transmitted.

DESCRIPTION OF EMBODIMENTS (Schema)

Figure 1:
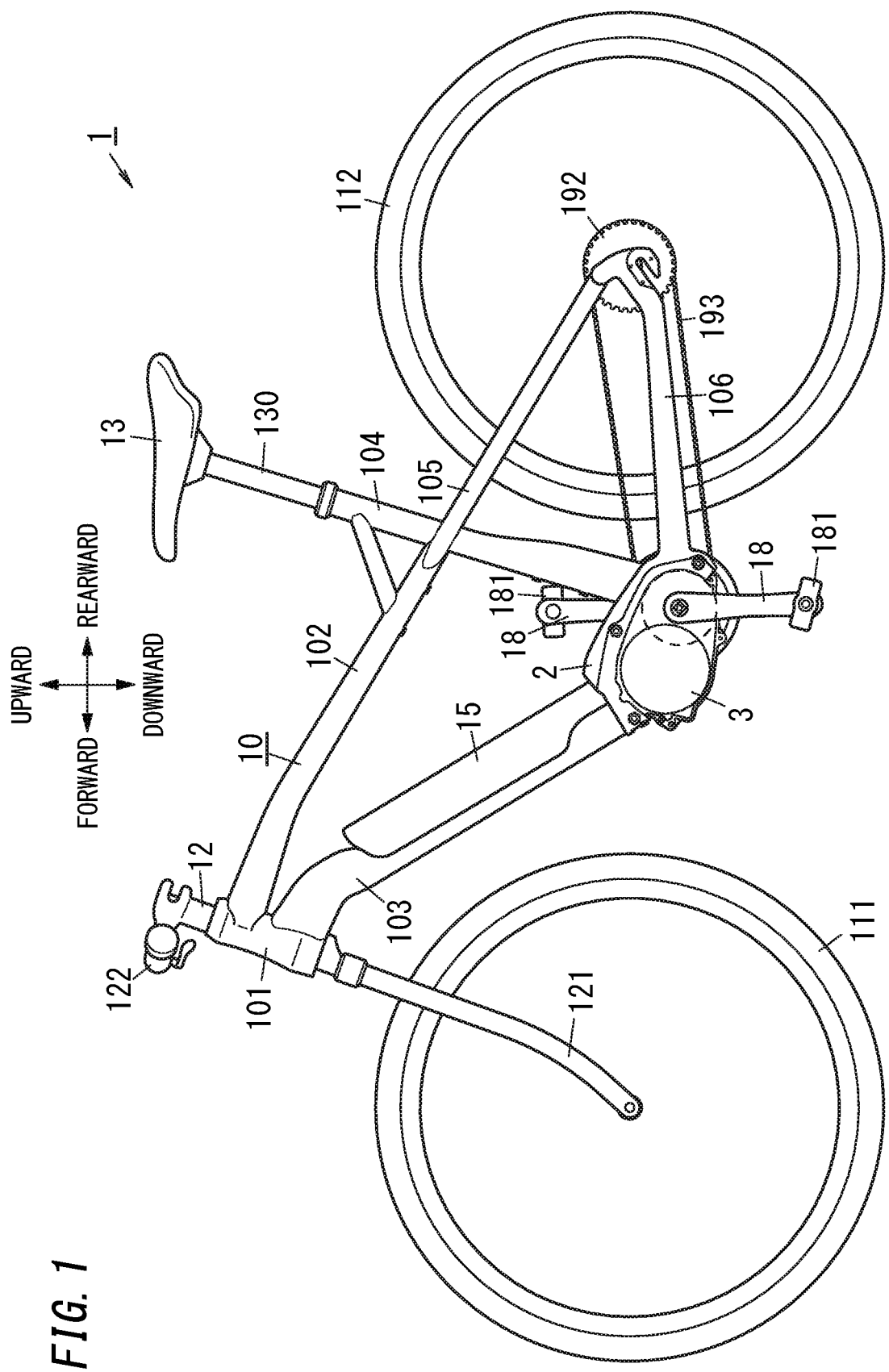
FIG. 1 is a side view illustrating an electric bicycle according to a first embodiment.
Figure 2:
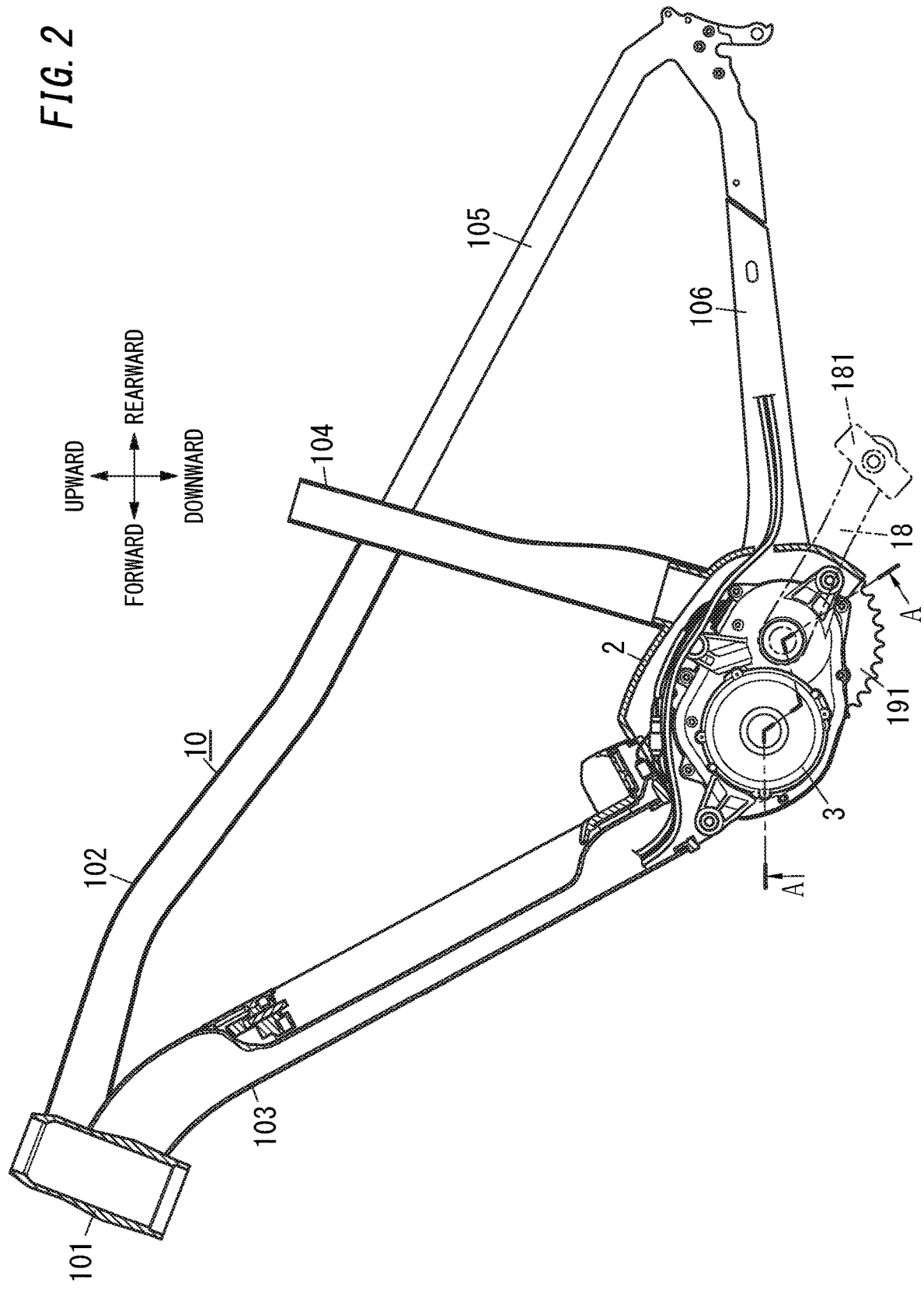
FIG. 2 is a sectional view illustrating a frame and a motor unit of the electric bicycle.

As illustrated in FIG. 1, a motor unit 3 of the present embodiment is mounted on an electric bicycle 1. Note that the electric bicycle 1 is an electric-assist bicycle (also called "electric assisted bicycle) but may be another electric bike such as an electric motorcycle. Moreover, a technique of the present disclosure is applicable also to a motor unit configured to generate mechanical energy in, for example, a vehicle other than the bicycle or a device other than the vehicle.

Figure 4:
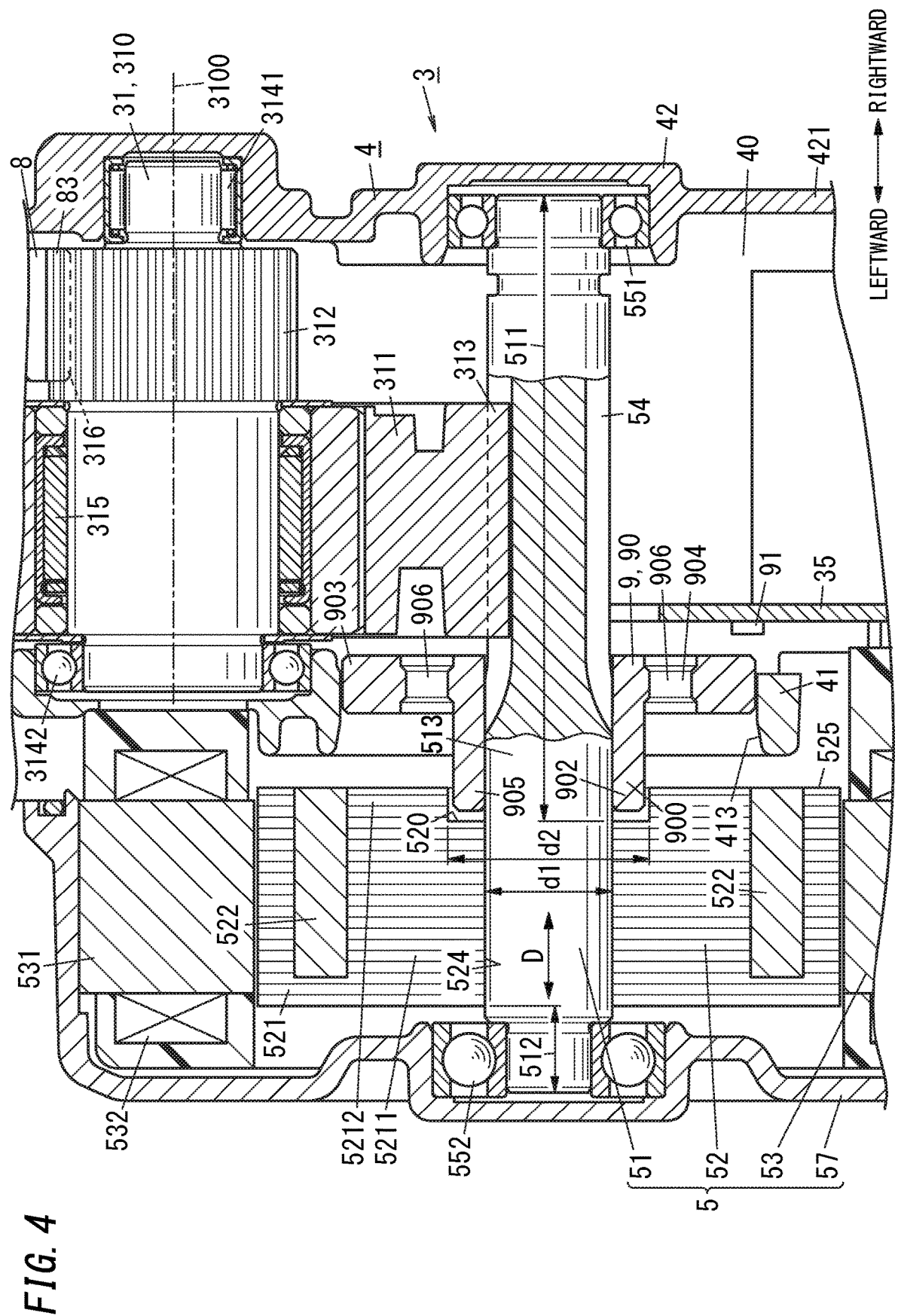
FIG. 4 is an enlarged view illustrating part A of FIG. 3.

As illustrated in FIG. 4, the motor unit 3 includes a motor 5 and a gear 311. The motor 5 includes a rotary shaft 51, a rotor 52, and a stator 53. The stator 53 rotates the rotor 52. The rotary shaft 51 has a projection 511 protruding from the rotor 52 along an axial direction D of the rotary shaft 51. That is, the rotary shaft 51 is inserted in a pore 524 formed in the rotor 52 and is fixed to the rotor 52, and the rotary shaft 51 has the projection 511 protruding from the pore 524 formed in the rotor 52. The motor 5 further has teeth 54. The teeth 54 are formed on an outer peripheral surface of the projection 511 and is engage with the gear 311. The rotor 52 includes a first portion 5211 and a second portion 5212. The first portion 5211 is located around the rotary shaft 51 and is fixed to the rotary shaft 51. The second portion 5212 is located at an end of the rotor 52, the end facing the projection 511. The second portion 5212 has an inner diameter $d_2$ larger than an inner diameter $d_1$ of the first portion 5211.

In the motor unit 3 of the present embodiment, the rotor 52 has the second portion, which enables the protrusion length of the projection 511 of the rotary shaft 51 to be increased while the length of the rotary shaft 51 is suppressed from being increased, the projection 511 protruding from the rotor 52. Thus, while a portion which is part of the projection 511 and on which the teeth 54 are to be formed is secured, the length of the rotary shaft 51 is suppressed from being increased. Thus, the size of the motor unit 3 is suppressed from being increased in the axial direction D of the rotary shaft 51.

(Configuration)

With reference to FIGS. 1 to 7, a configuration of the electric bicycle 1 of the present embodiment will be described below. Note that the electric bicycle 1 has a traveling direction prescribed by design. In the following description, the traveling direction is defined as a forward direction, and a direction opposite to the forward direction is defined as a rearward direction. Moreover, a leftward direction and a rightward direction are defined regarding the frontward direction.

As illustrated in FIG. 1, the electric bicycle 1 includes a frame 10, a front-side sprocket 191 (see FIG. 2), a rear-side sprocket 192, and the motor unit 3. Moreover, the electric bicycle 1 of the present embodiment includes a front wheel 111 and a rear wheel 112 as wheels. The electric bicycle 1 of the present embodiment further includes a handle post 12, handlebars 122, a saddle 13, a pair of crank arms 18, and a pair of pedals 181.

The frame 10 includes a head tube 101, a top tube 102, a down tube 103, a seat tube 104, a seat stay 105, a chain stay 106, and a bracket 2.

The handle post 12 extends through the head tube 101 in an upward and downward direction. The handle post 12 is rotatable about the central axis of the head tube 101. The handle post 12 has an upper end to which the handlebars 122 are connected. One of the handlebars 122 is provided with a hand operation section for, for example, turning on and off of electric power (switching between enablement and disablement of electric power supply to the motor unit 3). The handle post 12 has a lower end provided with a fork 121. The front wheel 111 is rotatably attached to the fork 121.

The top tube 102 has a front end connected to the head tube 101. The top tube 102 has a rear end connected to an upper portion of the seat tube 104. The seat tube 104 has an upper end via which a seat post 130 of the saddle 13 is inserted into the seat tube 104. The seat post 130 is fixed to the seat tube 104. The seat tube 104 has a lower end to which a bracket 2 is connected.

The down tube 103 is located below the top tube 102. The down tube 103 has a front end connected to the head tube 101. The down tube 103 has a rear end connected to the bracket 2. A battery 15 is removably attached to the down tube 103.

The seat stay 105 has a front end connected to the rear end of the top tube 102. A chain stay 106 is located below the seat stay 105. The seat stay 105 has a rear end connected to a rear end of the chain stay 106. The rear wheel 112 is rotatably connected to a connector connecting the seat stay 105 to the chain stay 106. The chain stay 106 has a front end connected to the bracket 2.

The motor unit 3 is attached to the bracket 2. The battery 15 supplies electric power to the motor unit 3. The pair of pedals 181 are attached to the motor unit 3 via the pair of crank arms 18. A driver actuates the pedals 181 to input human-powered driving force in the motor unit 3. Thus, the motor unit 3 generates auxiliary driving force and adds the auxiliary driving force to the human-powered driving force to generate driving force. The driving force thus generated by the motor unit 3 (driving force obtained by adding the auxiliary driving force to the human-powered driving force) is transmitted to the rear wheel 112 via a chain 193 which will be described later. Note that the auxiliary driving force of the present embodiment is transmitted to only the rear wheel 112 but may be transmitted to both the front wheel 111 and the rear wheel 112 or to only the front wheel 111.

Figure 3:
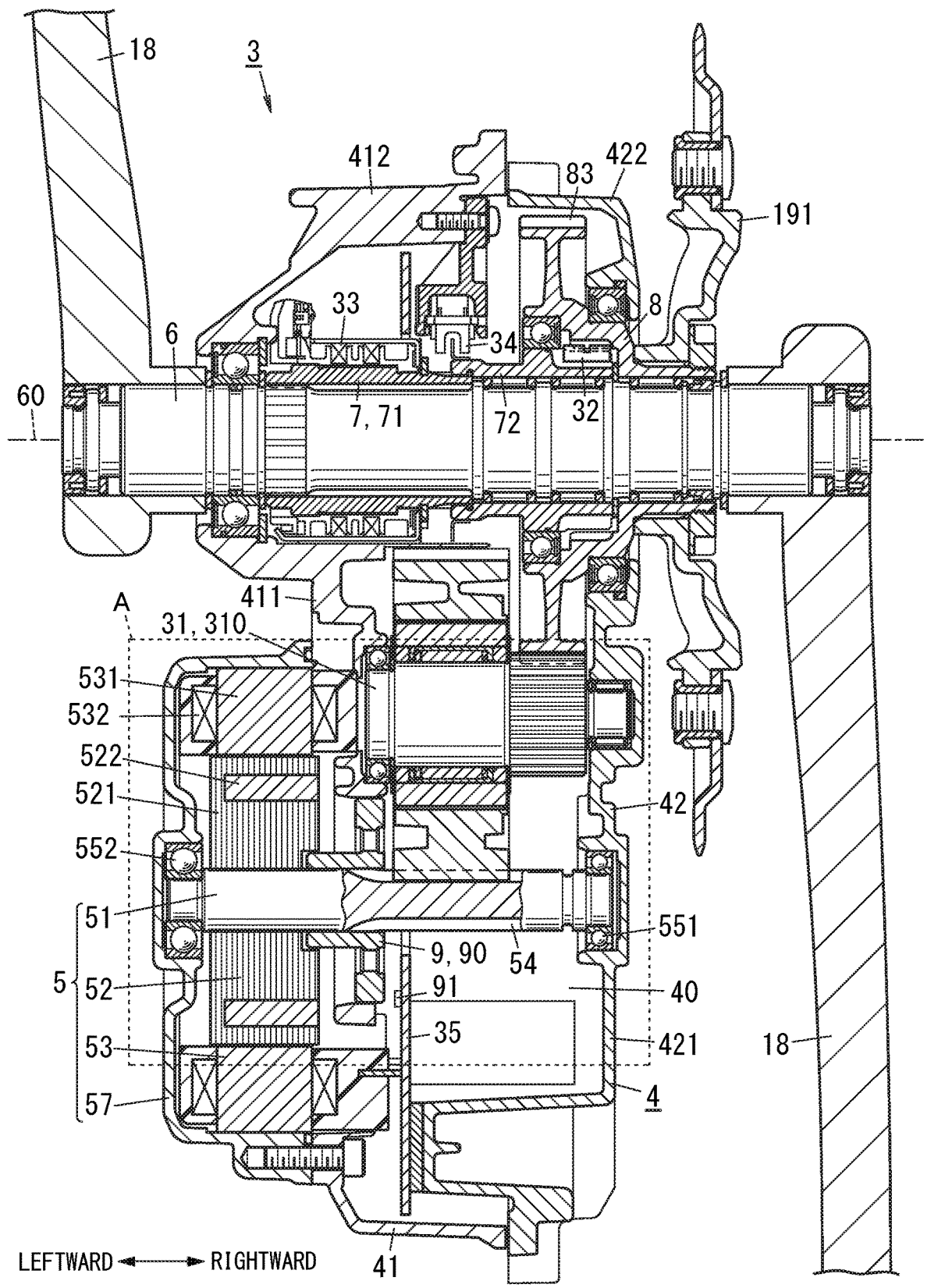
FIG. 3 is a sectional view along line A-A of FIG. 2.

As illustrated in FIG. 3, the motor unit 3 includes a case 4, an input shaft 6, an inputter 7, an outputter 8, a one-way clutch 32, a deceleration mechanism 31, and the motor 5.

The case 4 is primarily made of metal. The metal is aluminum, stainless steel, or the like. However, the case 4 may be made of non-metal, and materials for the case 4 are not particularly limited.

The case 4 of the present embodiment is constituted by left and right split bodies 41 and 42. Of the left and right split bodies 41 and 42, the left split body 41 is referred to as a first split body 41 and the right split body 42 is referred to as a second split body 42 as necessary in the following description.

The first split body 41 has a container shape whose internal space is open rightward. The first split body 41 of the present embodiment has a container shape whose internal shape is open rightward. The first split body 41 includes a side wall 411 and a peripheral edge 412. The side wall 411 constitutes a left side wall of the case 4. The peripheral edge 412 protrudes rightward from a peripheral edge of the side wall 411.

The second split body 42 has a container shape whose internal space is open leftward. The second split body 42 includes a side wall 421 and a peripheral edge 422. The side wall 421 constitutes a right side wall of the case 4. The peripheral edge 422 protrudes leftward from a peripheral edge of the side wall 421. The first split body 41 and the second split body 42 are fixed to each other with the peripheral edge 412 and the peripheral edge 422 being in contact with each other. The internal space of the first split body 41 is communicated with the internal space of the second split body 42. The internal space of the first split body 41 and the internal space of the second split body 42 constitute an accommodation space 40. In the accommodation space 40 formed in the interior of the case 4, part of the input shaft 6, the inputter 7, part of the outputter 8, the one-way clutch 32, and the deceleration mechanism 31 are located.

The input shaft 6 has an axis 60 parallel to the rightward/leftward direction (lateral direction). Note that the "axis" mentioned in the present disclosure means a central axis. The input shaft 6 has a left end extending through the side wall 411 of the first split body 41 in the rightward/leftward direction. The input shaft 6 has a right end extending through the side wall 421 of the second split body 42 in the rightward/leftward direction. That is, the input shaft 6 extends through the case 4 in the rightward/leftward direction.

The input shaft 6 is rotatable about the axis 60. The input shaft 6 has both ends protruding in the rightward/leftward direction from the case 4 to the outside. To each of the both ends of the input shaft 6 in the rightward/leftward direction, one end of a corresponding one of the pair of crank arms 18 is connected. The pedal 181 (see FIG. 1) is rotatably attached to an opposite end of each of the pair of crank arms 18 from the input shaft 6 in a longitudinal direction of each crank arm 18. A driver actuates the pedal 181 attached to each crank arm 18, thereby torque of each crank arm 18 is transmitted as human power to the input shaft 6.

In the case 4, the inputter 7 is disposed around the input shaft 6. The inputter 7 has a cylindrical shape whose axial direction is parallel to the rightward/leftward direction. The inputter 7 of the present embodiment is constituted by a plurality of inputters 71 and 72 aligned in the rightward/leftward direction. The inputter 7 is fixed to the input shaft 6 and rotates along with the input shaft 6. Note that the inputter 7 may be a single member. Moreover, the inputter 7 may be formed integrally with the input shaft 6.

In the case 4, the outputter 8 is disposed around the inputter 7. The outputter 8 is rotatable about the inputter 7. Between the inputter 7 and the outputter 8, the one-way clutch 32 is disposed. When torque in a direction (hereinafter referred to as an acceleration direction) in which the electric bicycle 1 is accelerated in the traveling direction is applied to the inputter 7, the one-way clutch 32 transmits the torque to the outputter 8, and when torque in a direction opposite to the acceleration direction is applied to the inputter 7, the one-way clutch 32 does not transmit the torque to the outputter 8.

The outputter 8 has an outer peripheral surface provided with teeth 83. The teeth 83 are engaged with teeth 316 (see FIG. 4) of a gear (second transmission gear) 312 included in the deceleration mechanism 31. The deceleration mechanism 31 transmits the rotation of the rotary shaft 51 of the motor 5 to the outputter 8 such that the rotation speed of the outputter 8 is slower than the rotation speed of the rotary shaft 51 of the motor 5. When the torque in the acceleration direction is applied to the outputter 8 via the deceleration mechanism 31, the one-way clutch 32 does not transmit the torque to the inputter 7.

The outputter 8 has a right end protruding from the case 4 to the outside. The front-side sprocket 191 is fixed to the right end of the outputter 8. The front-side sprocket 191 rotates along with the outputter 8. As illustrated in FIG. 1, the rear-side sprocket 192 is fixed to a hub of the rear wheel 112. The chain 193 is wrapped on the front-side sprocket 191 and the rear-side sprocket 192.

When the torque in the acceleration direction is applied to the input shaft 6 shown in FIG. 3 and the input shaft 6 rotates, the inputter 7 rotates along with the input shaft 6. The torque in the acceleration direction of the inputter 7 is applied to the outputter 8 via the one-way clutch 32, and thereby, the outputter 8 and the front-side sprocket 191 rotate in the acceleration direction. When the front-side sprocket 191 rotates in the acceleration direction, the torque in the acceleration direction is applied via the chain 193 to the rear-side sprocket 192, and the rear-side sprocket 192 and the rear wheel 112 rotate in the acceleration direction. Thus, the electric bicycle 1 is accelerated in the traveling direction.

As illustrated in FIG. 4, the motor 5 includes the rotary shaft 51, the rotor 52, and the stator 53. The motor 5 of the present embodiment further includes a cup 57. The cup 57 accommodates part of the rotary shaft 51, the rotor 52, and the stator 53. The cup 57 is made of metal. However, the cup 57 may be made of non-metal, and materials for the cup 57 are not particularly limited.

The cup 57 is attached to the side wall 411 of the first split body 41. The side wall 411 has a through hole 413 which is circular and which penetrates through the side wall 411 in the rightward/leftward direction. The cup 57 covers the through hole 413 from the left side of the side wall 411. The cup 57 has a container shape whose internal space is open rightward. The internal space of the cup 57 is communicated with the internal space of the first split body 41 via the through hole 413.

The axial direction D of the rotary shaft 51 is parallel to the rightward/leftward direction. The axial direction of the rotary shaft 51 is hereinafter referred to simply as an "axial direction D". The rotor 52 concentric with the rotary shaft 51 is located around the rotary shaft 51.

The rotor 52 is an embedded magnet-type rotor having a cylindrical shape. The rotor 52 includes a rotor core 521 and a plurality of permanent magnets 522 held by the rotor core 521. The rotor core 521 has a cylindrical shape and includes a plurality of electromagnetic steel plates layered in the rightward/leftward direction (axial direction D). Each electromagnetic steel plate is made of soft magnetic body such as silicon steel. Note that the rotor core 521 may be a single member. Moreover, the rotor core 521 may be made of a material other than the electromagnetic steel plate.

The rotary shaft 51 protrudes from the rotor core 521 to both sides in the rightward/leftward direction. The rotary shaft 51 includes a projection 511 and a projection 512. The projection 511 protrudes from the first portion 5211 to one side, i.e., rightward, in the axial direction D. The projection 512 protrudes from the first portion 5211 to an opposite side, i.e., leftward, of the projection 511. One of both of the projections 511 and 512 is referred to as a first projection 511 and the other of the projections 511 and 512 is referred to as a second projection 512.

The rotor core 521 includes the first portion 5211 and the second portion 5212. The rotor core 521 of the present embodiment consists of the first portion 5211 and the second portion 5212.

The first portion 5211 has a cylindrical shape whose axial direction is parallel to the rightward/leftward direction, and the first portion 5211 constitutes a portion other than a right side end of the rotor core 521. That is, the first portion 5211 is a portion of the rotor core 521 except for an end facing the projection 511 in the axial direction D. The pore 524 penetrating in the rightward/leftward direction is formed on an inner side of the first portion 5211.

The rotary shaft 51 inserted in the pore 524 formed in the first portion 5211 and extends through the rotor 52 in the rightward/leftward direction. That is, the rotary shaft 51 extends though the rotor 52 in the axial direction D. The first portion 5211 is located around the rotary shaft 51. The rotary shaft 51 is press fit in the pore 524 and is pressed from its periphery by the rotor 52. Thus, the first portion 5211 is fixed to the rotary shaft 51. Note that the rotary shaft 51 may be fixed to the rotor core 521 with an adhesive or the like.

The second portion 5212 has a cylindrical shape which is concentric with the first portion 5211. The second portion 5212 is located to adjoin the right side of the first portion 5211. The second portion 5212 is continuous to the first portion 5211. That is, the first portion 5211 adjoins the second portion 5212 in the axial direction D. The second portion 5212 is formed integrally with the first portion 5211. The second portion 5212 constitutes the right side end of the rotor core 521. That is, the second portion 5212 is an end which is part of the rotor core 521 and which faces the projection 511 in the axial direction D.

The second portion 5212 has an inner diameter d2 larger than an inner diameter d1 of the first portion 5211. That is, the diameter of the pore 524 in the first portion 5211 is larger than the diameter of the pore 524 in the second portion 5212. Thus, on an inner side of the second portion 5212, a recess 520 is formed. The recess 520 is an outer periphery of the pore 524 formed in the second portion 5212. The recess 520 has an annular shape when viewed in the rightward/leftward direction, and the recess 520 extends through the entire length in a circumferential direction of the rotor core 521. The recess 520 is open to the first projection 511 in the rightward/leftward direction (axial direction D) and to an inner side of the rotor core 521.

The protrusion length (length in the rightward/leftward direction) of the first projection 511 of the rotary shaft 51 is longer than the protrusion length (length in the rightward/leftward direction) of the second projection 512, the first projection 511 protruding from the rotor 52 toward one side in the axial direction D. Of both of the ends of the rotary shaft 51 in the rightward/leftward direction, one end is a tip end of the first projection 511, and the other end is the second projection 512. The first projection 511 extends through the through hole 413 and protrudes from the side wall 411 of the first split body 41 into the internal space of the first split body 41 and the internal space of the second split body 42.

The motor unit 3 includes a pair of bearings 551 and 552. Of the pair of bearings 551 and 552, one bearing is referred to as a first bearing 551 and the other bearing is referred to as a second bearing 552 as necessary in the following description. The first bearing 551 is located in the case 4 and is fixed to the second split body 42. The first bearing 551 rotatably supports the tip end of the first projection 511. The second bearing 552 is located in the cup 57 and is fixed to the cup 57. In the present embodiment, the motor 5 has the second bearing 552. The second bearing 552 supports the second projection 512. That is, the first bearing 551 and the second bearing 552 rotatably support respective ends of the rotary shaft 51 in the rightward/leftward direction. Each of the bearings 551 and 552 is a ball bearing.

The first bearing 551 of the present embodiment has a ball smaller than a ball of the second bearing 552, and the first bearing 551 has an outer diameter smaller than an outer diameter of the second bearing 552. That is, when viewed in the rightward/leftward direction, the first bearing 551 is disposed on an inner side of an outer peripheral edge of the second bearing 552. Thus, a space in which other components are to be disposed is secured around the first bearing 551 while the motor unit 3 is downsized. Note that each of the bearings 551 and 552 is not limited to the ball bearing but may be, for example, a roller bearing.

A plurality of permanent magnets 522 are embedded in the rotor core 521. The plurality of permanent magnets 522 are aligned in the circumferential direction of the rotor core 521. Note that the permanent magnet 522 may be attached to a surface of the rotor core 521. Moreover, the rotor 52 may be a permanent magnet magnetized such that magnetic poles alternately differ in a circumferential direction of the rotor 52.

The stator 53 is disposed around the rotor 52 with an air gap provided between the stator 53 and the rotor 52. The stator 53 rotates the rotor 52. The stator 53 is a winding wire stator including a stator core 531 and a coil 532. The stator core 531 has a cylindrical shape whose axial direction is parallel to the rightward/leftward direction. The stator core 531 is disposed concentrically with the rotor 52. The coil 532 is wound on the stator core 531. Energizing the coil 532 excites the stator core 531, thereby rotating the rotor 52.

The outer peripheral surface of the first projection 511 of the rotary shaft 51 has the teeth 54 formed to engage with teeth 313 of the gear 311 included in the deceleration mechanism 31. The teeth 54 is formed on only a portion of the first projection 511, the portion being located between the tip end and a base end 513 of the first projection 511.

The deceleration mechanism 31 transmits the rotation of the rotary shaft 51 to the outputter 8 such that the rotation speed of the outputter 8 is slower than the rotation speed of the rotary shaft 51. The deceleration mechanism 31 includes a gear shaft (transmission rotary shaft) 310, a pair of bearings 3141 and 3142, a gear 311, and a gear 312. In the following description, the gear 311 is referred to as a first transmission gear 311, and the gear 312 is referred to as a second transmission gear 312 as necessary.

The gear shaft 310 has an axis 3100 parallel to the rightward/leftward direction.

Respective ends of the gear shaft 310 in rightward/leftward direction are rotatably supported by the pair of bearings 3141 and 3142 disposed in the accommodation space 40. The gear shaft 310 is rotatable about the axis 3100.

The first transmission gear 311 is located around the gear shaft 310. The first transmission gear 311 has a cylindrical shape whose axis is parallel to the rightward/leftward direction. The first transmission gear 311 has an outer peripheral surface having the teeth 313. The teeth 313 are engaged with the teeth 54 of the rotary shaft 51, thereby transmitting torque of the rotary shaft 51 to the first transmission gear 311.

The first transmission gear 311 is coupled to the gear shaft 310 via the one-way clutch 315. When torque in the acceleration direction is applied to the first transmission gear 311, the one-way clutch 315 transmits the torque to the gear shaft 310, and when torque in a direction opposite to the acceleration direction is applied to the first transmission gear 311, the one-way clutch 315 does not transmit the torque to the gear shaft 310. Moreover, when the torque in the acceleration direction is applied to the gear shaft 310, the one-way clutch 315 does not transmits the torque to the first transmission gear 311.

The second transmission gear 312 located rightward from the first transmission gear 311 is disposed around the gear shaft 310. The second transmission gear 312 is fixed to the gear shaft 310. The second transmission gear 312 rotates along with the gear shaft 310. The second transmission gear 312 has an outer peripheral surface having the teeth 316. The teeth 316 are engaged with the teeth 83 of the outputter 8.

When the rotary shaft 51 of the motor 5 rotates, the first transmission gear 311 rotates. When torque of the first transmission gear 311 is transmitted via the one-way clutch 315 to the gear shaft 310, the gear shaft 310 and the second transmission gear 312 rotate. Thus, torque of second transmission gear 312 is transmitted to the outputter 8.

As illustrated in FIG. 3, the motor unit 3 further includes a torque detector 33, a rotation speed detector 34, and a control board (printed circuit board) 35. The torque detector 33, the rotation speed detector 34, and the control board 35 are disposed in the accommodation space 40 of the case 4.

The torque detector 33 detects torque applied to the input shaft 6. Examples of the torque detector 33 include a magnetostriction torque sensor. The torque detector 33 is located around the inputter 7. Note that the torque detector 33 is not limited to the magnetostriction torque sensor.

The rotation speed detector 34 detects the rotation speed of the input shaft 6 per unit time. The rotation speed detector 34 is located around the inputter 7. Examples of the rotation speed detector 34 include an optical rotation detector. Note that the rotation speed detector 34 is not limited to the optical rotation detector.

The control board 35 is disposed along the side wall 411 of the first split body 41. The thickness direction of the control board 35 is parallel to the rightward/leftward direction. At least part of the control board 35 overlaps the stator 53 and the rotor 52 when viewed in the rightward/leftward direction. The at least part of the control board 35 overlaps the rotary shaft 51, the gear shaft 310 (see FIG. 4), the first transmission gear 311 (see FIG. 4), the one-way clutch 315 (see FIG. 4), the input shaft 6, and the inputter 7 when viewed in a direction orthogonal to the rightward/leftward direction.

The control board 35 includes a controller configured to control the motor 5. The controller includes, for example, a microcomputer and executes a program stored in a storage section such as Read Only Memory (ROM) to control operation of each element. As such a controller, a publicly known controller is accordingly available, and thus, the detailed description thereof is omitted. The controller controls rotational speeds of the rotor 52 and the rotary shaft 51 of the motor 5 based on the torque detected by the torque detector 33 and the rotational speed detected by the rotation speed detector 34.

While the electric bicycle 1 is moved in the traveling direction by human power, applying torque of the rotary shaft 51 of the motor 5 to the outputter 8 causes the outputter 8 to output combination force resulting from combination of torque of the human power from the inputter 7 and the torque from the motor 5. In this case, the outputter 8 functions as a combined-force member which combines the torque of the human power from the inputter 7 and the torque from the motor 5 with each other.

When the motor 5 is not driven while the electric bicycle 1 is moved in the traveling direction by human power, the outputter 8 rotates in the acceleration direction, and therefore, the second transmission gear 312 and the gear shaft 310 which are engaged with the outputter 8 rotate in the acceleration direction. However, in this case, the torque of the gear shaft 310 in the acceleration direction is not transmitted to the first transmission gear 311 by the one-way clutch 315 (see FIG. 4). Thus, when the motor 5 is not driven, rotation of the rotary shaft 51 and the rotor 52 is inhibited.

The motor unit 3 further includes a rotation detector 9 configured to detect rotational positions (including rotational speeds) of the rotor 52 and the rotary shaft 51. The rotation detector 9 includes a sensor magnet 90 configured to rotate along with the rotary shaft 51 and a magnetic sensor 91 configured to detect magnetism of the sensor magnet 90.

Figure 5:
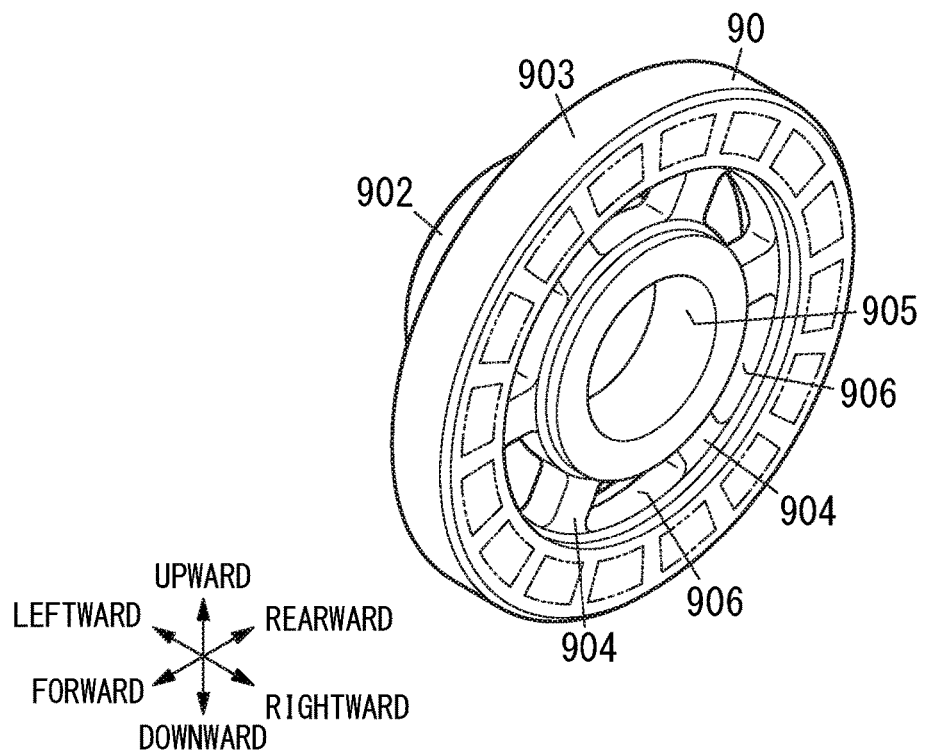
FIG. 5 is a perspective view illustrating a sensor magnet included in the motor unit.

The sensor magnet 90 is disposed in the case 4 (specifically, in the through hole 413). The sensor magnet 90 of the present embodiment shown in FIGS. 4 and 5 is a plastic magnet. The sensor magnet 90 is fixed to an intermediate portion of the rotary shaft 51 in the axial direction D. That is, the sensor magnet 90 constitutes a fixed member fixed to the rotary shaft 51. Note that the fixed member is at least a member fixed to the rotary shaft 51 and is not limited to the sensor magnet 90.

The sensor magnet 90 includes a fixing part 902, an annular part 903, and a plurality of couplers 904. The fixing part 902 has a cylindrical shape whose axis is parallel to the rightward/leftward direction. As illustrated in FIG. 4, the fixing part 902 is located around the base end 513 (portion located between the rotor 52 and the teeth 313) of the first projection 511. The base end 513 of the first projection 511 is press fit in a pore 905 formed on an inner side of the fixing part 902. Thus, the sensor magnet 90 is fixed to the rotary shaft 51. Note that the fixing part 902, in which the first projection 511 is press fit, may be adhered to the rotary shaft 51 with an adhesive. Moreover, the fixing part 902 of the present embodiment is located around an end of the teeth 313, the end facing the rotor 52 in the axial direction D. However, the fixing part 902 may be located between the rotor 52 and the teeth 313 in the axial direction D.

The annular part 903 which is concentric with the fixing part 902 and which is located apart from the fixing part 902 is located around a right end of the fixing part 902. At least part of the annular part 903 overlaps a left end of the gear shaft 310 viewed in the direction orthogonal to the rightward/leftward direction. That is, the left end of the gear shaft 310 and the annular part 903 are located on an identical plane orthogonal to the rightward/leftward direction.

As illustrated in FIG. 5, the annular part 903 has an annular shape when viewed in the rightward/leftward direction. The annular part 903 has a right-side surface which is magnetized, for example, such that magnetic poles with different polarities are alternately located in a circumferential direction of the annular part 903. Note that in FIG. 5, magnetized portions are indicated by long dashed double-short dashed line.

Between the fixing part 902 and the annular part 903, the plurality of couplers 904 are located. The plurality of couplers 904 are aligned at intervals in a circumferential direction of the fixing part 902. The fixing part 902 and the annular part 903 are integrally connected with each other via the plurality of couplers 904. Each of the plurality of couplers 904 extends in a direction (radial direction of the sensor magnet 90) orthogonal to a rotation direction (circumferential direction of the sensor magnet 90) of the sensor magnet 90. Note that each coupler 904 at least extends in a direction transverse to the rotation direction of the sensor magnet 90 and may extend in a direction tilted to the direction orthogonal to the rotation direction of the sensor magnet 90.

As illustrated in FIG. 4, the magnetic sensor 91 facing the sensor magnet 90 is disposed in the case 4. In the present embodiment, the magnetic sensor 91 is packaged on the control board 35. The magnetic sensor 91 is located on the right of the annular part 903 and faces the annular part 903. The rotation detector 9 causes the magnetic sensor 91 to detect a change in magnetic field resulting from the rotation of the sensor magnet 90 to detect the rotational position of the rotor 52. The control board 35 controls, for example, driving of the motor 5 based on a result of the detection.

The magnetic sensor 91 is, for example, a hole Integrated Circuit (IC). Note that the magnetic sensor 91 may be a hole element, a Magnetic Resistance (MR) element, or the like. Moreover, the sensor magnet 90 is not limited to the sensor magnet 90 of the present embodiment but may include a permanent magnet magnetized such that magnetic poles alternately differ, for example, in the circumferential direction.

The sensor magnet 90 has a plurality of holes 906. Each of the plurality of holes 906 penetrates through the sensor magnet 90 in the rightward/leftward direction and is open at both sides of the sensor magnet 90 in the rightward/leftward direction. Each hole 906 is formed between adjacent couplers 904. Thus, when the sensor magnet 90 rotates along with the rotary shaft 51, the plurality of couplers 904 of the sensor magnet 90 agitate air in the case 4. That is, each of the plurality of couplers 904 constitutes a blade for agitating the air in the case 4. Thus, heat generated by the stator 53 or the like is less likely to remain in the case 4, and thus, the heat dissipation characteristic of the motor unit 3 is improved.

As described above, the second portion 5212 of the rotor 52 shown in FIG. 4 has an inner diameter d2 larger than an inner diameter d1 of the first portion 5211. Thus, the protrusion length of the projection 511 of the rotary shaft 51 can be increased, the projection 511 protruding from the rotor 52. Therefore, while a portion which is part of the projection 511 and on which the teeth 54 are to be formed is secured, the length of the rotary shaft 51 is suppressed from being increased.

In the present embodiment, the fixing part 902 has a left end which is part of the sensor magnet 90 and which is located on the inner side (in the recess 520) of the second portion 5212. The left end of the fixing part 902 of the present embodiment is not fixed to the rotor core 521 but may be fixed to the rotor core 521. The fixation may be performed by, for example, press fitting of the left end of the fixing part 902 in the inner side (in the recess 520) of the second portion 5212 or adhesion of the left end of the fixing part 902 to the rotor core 521 with an adhesive.

As described above, part of the fixing part 902 of the sensor magnet 90 is located on the inner side of the second portion 5212, and thereby, the length (press fit margin) of a portion of the rotary shaft 51 in the rightward/leftward direction is increased, the portion being to be press fit in the fixing part 902. This enables the sensor magnet 90 to be firmly fixed to the rotary shaft 51. Note that at least only part of the fixing part 902 in the rightward/leftward direction is disposed on the inner side of the second portion 5212, and the entirety of the fixing part 902 may be disposed in the recess 520.

Moreover, since part of the fixing part 902 of the sensor magnet 90 is located on the inner side of the second portion

5212, the sensor magnet 90 may be disposed at a location close to the rotor 52 in the rightward/leftward direction. Thus, the teeth 54 of the rotary shaft 51 may be formed at a location close to the rotor 52 in the rightward/leftward direction. Thus, the first transmission gear 311, the gear shaft 310, and the second transmission gear 312 of the deceleration mechanism 31 can be disposed at locations close to the rotor 52 in the rightward/leftward direction to downsize the motor unit 3.

Moreover, in the sensor magnet 90 of the present embodiment, the diameter (outer diameter) of the annular part 903 is smaller than the diameter (outer diameter) of the rotor core 521, and the sensor magnet 90 is disposed inward from an outer peripheral edge of the rotor 52 when viewed in the rightward/leftward direction. Thus, the gear shaft 310 of the deceleration mechanism 31 may be disposed around the sensor magnet 90. Thus, in the direction orthogonal to the rightward/leftward direction, the rotary shaft 51 and the gear shaft 310 can be disposed at locations close to each other to downsize the motor unit 3 in the direction orthogonal to the rightward/leftward direction.

Note that the fixing part 902 of the sensor magnet 90 does not have to be disposed in the recess 520. Moreover, the rotation detector 9 may be omitted.

Second Embodiment

Figure 6:
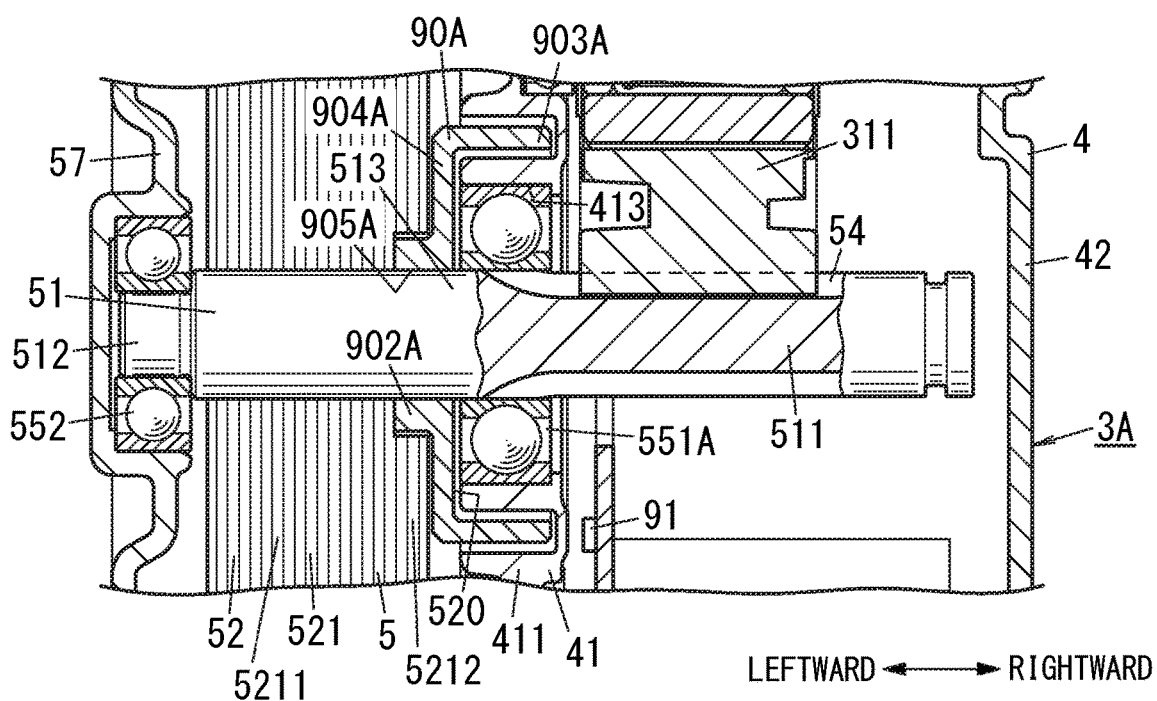
FIG. 6 is a sectional view illustrating an inner structure of a motor unit of a second embodiment.

Next, a motor unit 3A of a second embodiment will be described with reference to FIG. 6. The motor unit 3A of the second embodiment includes a bearing 551A in place of the bearing 551 (see FIG. 4) of the motor unit 3 of the first embodiment. The bearing 551A is fitted in a through hole 413 formed in a case 4 and is fixed to a side wall 411 of a first split body 41. The bearing 551A rotatably supports a base end 513 of a first projection 511 of a rotary shaft 51. That is, in the rotary shaft 51 of the present embodiment, the base end 513 of the first projection 511 and a second projection 512 are respectively supported by the bearing 551A and a bearing 552 which are paired.

Moreover, the motor unit 3A of the present embodiment includes a sensor magnet 90A in place of the sensor magnet 90 of the first embodiment. The sensor magnet 90A is a plastic magnet magnetized such that magnetic poles alternately differ in, for example, a circumferential direction of the sensor magnet 90A.

The sensor magnet 90A is accommodated in a cup 57. The sensor magnet 90A includes a fixing part 902A, an annular part 903A, and a coupler 904A.

The fixing part 902A has a cylindrical shape whose axis is parallel to the rightward/leftward direction. In the cup 57, the fixing part 902A is located around the base end 513 of the first projection 511. The fixing part 902A has a left side end located on an inner side of a second portion 5212 of a rotor 52. The base end 513 of the first projection 511 is press fitted in a pore 905A formed on an inner side of the fixing part 902A. Thus, the sensor magnet 90A is fixed to the rotary shaft 51. Note that the fixing part 902A, in which the first projection 511 is press fit, may be adhered to the rotary shaft 51 with an adhesive.

The annular part 903A which is concentric with the fixing part 902A and which is located apart from the fixing part 902A is located around a right end of the fixing part 902A. The annular part 903A has an annular shape when viewed in the rightward/leftward direction.

Between the fixing part 902A and the annular part 903A, the coupler 904A is located. The right end of the fixing part 902A and a left end of the annular part 903A are connected integrally with each other via the coupler 904A. The annular part 903A protrudes rightward from the coupler 904A. The annular part 903A is disposed at a location where the annular part 903A overlaps a magnetic sensor 91 in the rightward/leftward direction, and the annular part 903A faces the magnetic sensor 91. The bearing 551A is disposed on an inner side of the annular part 903A.

Third Embodiment

Figure 7:
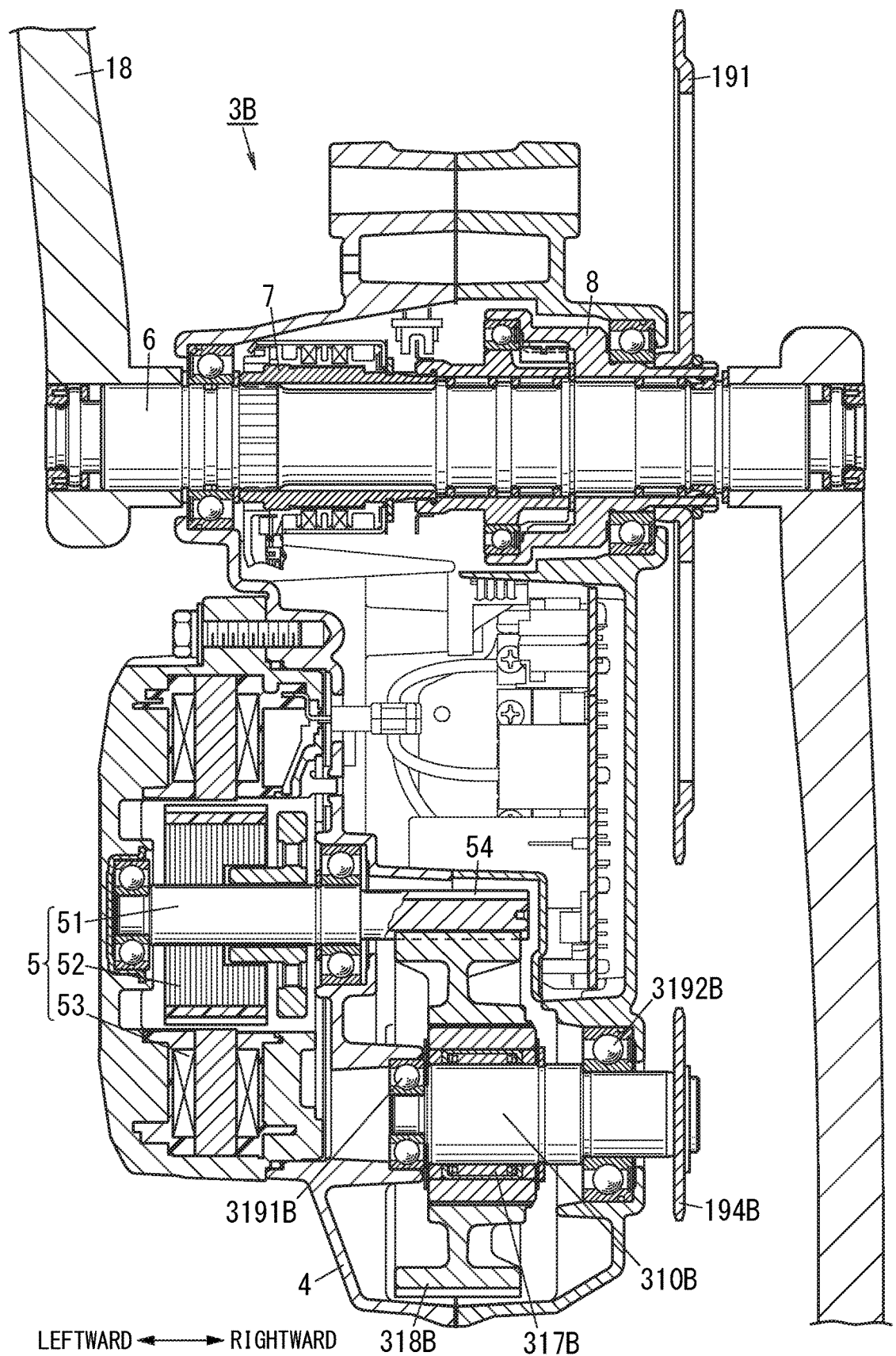
FIG. 7 is a sectional view illustrating a motor unit of a third embodiment, the sectional view corresponding to FIG. 3.

Next, a motor unit 3B of a third embodiment will be described with reference to FIG. 7. The motor unit 3 of the first embodiment is a so-called single-shaft motor unit, whereas the motor unit 3B in the third embodiment is a so-called double-shaft motor unit.

The motor unit 3B does not include the deceleration mechanism 31 but includes a second outputter 310B different from the outputter 8. The second outputter 310B has a left end located in a case 4 and is rotatably supported by a bearing 3191B disposed in a first split body 41. The second outputter 310B has an intermediate portion in the rightward/leftward direction rotatably supported by a bearing 3192B fixed to a second split body 42. The second outputter 310B has a right end located outside the case 4. To the right end of the second outputter 310B, a sprocket 194B is fixed such that the sprocket 194B rotates along with the second outputter 310B. A chain 193 (see FIG. 1) is wrapped on the sprocket 194B, a front-side sprocket 191 (see FIG. 2), and a rear-side sprocket 192 (see FIG. 1). A gear 318B which engages with teeth 54 of a rotary shaft 51 of a motor 5 is disposed around the second outputter 310B via a one-way clutch 317B.

When the rotary shaft 51 of the motor 5 rotates in the acceleration direction while an electric bicycle is moved in a traveling direction by human power, the gear 318B which engages with the teeth 54 of the rotary shaft 51 of the motor 5 rotates in the acceleration direction. Torque of the gear 318B in the acceleration direction is transmitted via the one-way clutch 317B to the second outputter 310B and is applied to the chain 193.

Moreover, when the motor 5 is not driven while the electric bicycle 1 is moved in the traveling direction by human power, the second outputter 310B rotates in the acceleration direction, but the torque of the second outputter 310B in the acceleration direction is not transmitted to the rotary shaft 51 of the motor 5 by the one-way clutch 317B. Thus, when the motor 5 is not driven, rotation of the rotary shaft 51 and the rotor 52 is inhibited.

(Aspects)

As can be seen from the above-described embodiment, a motor unit (3; 3A; 3B) of a first aspect includes a motor (5) and a gear (311; 318B). The motor (5) includes a rotary shaft (51), a rotor (52), and a stator (53). The stator (53) is configured to rotate the rotor (52). The rotary shaft (51) has a projection (first projection) (511). The projection (511) protrudes from the rotor (52) along an axial direction (D) of the rotary shaft (51). The motor (5) further has teeth (54). The teeth (54) are formed on an outer peripheral surface of the projection (511) and are engaged with the gear (311; 318B). The rotor (52) has a first portion (5211) and a second portion (5212). The first portion (5211) is located around the rotary shaft (51) and is fixed to the rotary shaft (51). The second portion (5212) is located at an end of the rotor (52), the end facing the projection (511). The second portion (5212) has an inner diameter (d2) larger than an inner diameter (d1) of the first portion (5211).

With this aspect, the rotor (52) includes the second portion (5212), which enables a protrusion length of the projection (511) of the rotary shaft (51) to be increased, the projection (511) protruding from the rotor (52). Thus, while a portion which is part of the projection (511) and on which the teeth (54) are to be formed is secured, the length of the rotary shaft (51) is suppressed from being increased. Thus, the size of the motor unit (3) is suppressed from being increased in the axial direction (D) of the rotary shaft (51).

A motor unit (3; 3A; 3B) of a second aspect would be realized in combination with the first aspect. The motor unit (3; 3A; 3B) of the second aspect further includes a sensor magnet (90; 90A). The sensor magnet (90; 90A) has a fixing part (902; 902A). The fixing part (902; 902A) is located around a portion (base end) (513) of the projection (511), the portion (base end) (513) being located between the rotor (52) and the teeth (54). The fixing part (902; 902A) is fixed to the rotary shaft (51).

This aspect enables the sensor magnet (90; 90A) to be fixed to the rotary shaft (51) at the portion which is part of the projection (511) and which is located between the rotor (52) and the teeth (54).

A motor unit (3; 3A; 3B) of a third aspect would be realized in combination with the second aspect. In the third aspect, the fixing part (902; 902A) has at least an end facing the rotor (52) in the axial direction (D), the end being located on an inner side of the second portion (5212).

With this aspect, at least part of the fixing part (902; 902A) is located on the inner side (in the recess (520)) of the second portion (5212) of the rotor core (521), so that a length of a portion of the rotary shaft (51) is increased, the portion being to be fixed to the fixing part (902; 902A). This enables the sensor magnet (90; 90A) to be firmly fixed to the rotary shaft (51). Moreover, at least the end which is part of the fixing part (902; 902A) and which faces the rotor (52) in the axial direction (D) is located on an inner side of the second portion (5212). Therefore, the sensor magnet (90; 90A) is disposed at a location close to the rotor (52) in the rightward/leftward direction. Thus, the teeth (54) of the rotary shaft (51) are formed at a location close to the rotor (52) in the axial direction (D). Thus, a gear (311) or the like which engages with the teeth (54) is disposed at a location close to the rotor (52) in the axial direction (D), thereby downsizing the motor unit (3; 3A; 3B).

A motor unit (3; 3A; 3B) of a fourth aspect would be realized in combination with the second or third aspect. In the fourth aspect, the sensor magnet (90) further includes a blade (coupler 904). The blade extends in a direction transverse to a rotation direction of the sensor magnet (90).

This aspect enables the blade (904) to agitate air in the vicinity of the sensor magnet (90) when the sensor magnet (90) rotates. This improves heat dissipation characteristic of the motor unit (3; 3B).

A motor unit (3; 3A; 3B) of a fifth aspect would be realized in combination with any one of the second to fourth aspects. In the fifth aspect, the sensor magnet (90) is located inward from an outer peripheral edge of the rotor (52) when viewed in the axial direction (D).

This aspect enables a space in which other components are to be disposed to be formed around the sensor magnet (90) and enables the motor unit (3; 3B) to be downsized.

A motor unit (3; 3A) of a sixth aspect would be realized in combination with the fifth aspect. The motor unit (3; 3A) of the sixth aspect further includes a gear shaft (310). Around the gear shaft (310), the gear (311) is provided. The gear shaft (310) is configured to rotate along with the gear (311). Part of the gear shaft (310) overlaps the sensor magnet (90) when viewed in a direction orthogonal to the axial direction (D).

With this aspect, the rotary shaft (51) and the gear shaft (310) are disposed at locations close to each other in a direction orthogonal to the axial direction (D), thereby downsizing the motor unit (3; 3A).

A motor unit (3) of a seventh aspect would be realized in combination with any one of the first to sixth aspects. In the seventh aspect, the rotary shaft (51) extends through the rotor (52) in the axial direction (D). The motor unit (3) further includes a first bearing (551) and a second bearing (552). The first bearing (551) is configured to rotatably support a tip end of the projection (511). The second bearing (552) is configured to rotatably support an end (second projection) (512) of the rotary shaft (51), the end (second projection) (512) facing away from the projection (511).

This aspect enables the first bearing (551) and the second bearing (552) to support respective ends of the rotary shaft (51) in the axial direction (D), so that the rotary shaft (51) is less likely to vibrate.

A motor unit (3) of an eighth aspect would be realized in combination with the seventh aspect. According to the eighth aspect, the first bearing (551) is disposed inward from an outer peripheral edge of the second bearing (552) when viewed in the axial direction (D).

This aspect enables a space in which other components are to be disposed to be secured around the first bearing (551) and enables the motor unit (3) to be downsized.

A motor unit (3A) of a ninth aspect would be realized in combination with any one of the first to sixth aspects. The motor unit (3A) of the ninth aspect includes a bearing (551A). The bearing (551A) is configured to rotatably support a portion (base end 513) of the projection (511), the portion being located between the rotor (52) and the teeth (54).

This aspect enables the bearing (551A) to support the portion which is part of the projection (511) of the rotary shaft (51) and which is located between the rotor (52) and the teeth (54).

An electric bicycle (1) of a tenth aspect includes the motor unit (3; 3A; 3B) of any one of the first to ninth aspects and a wheel (112). Driving force of the motor (5) included in the motor unit (3; 3A; 3B) is transmitted to the wheel (111; 112).

This aspect enables the motor unit (3; 3A; 3B) of the electric bicycle (1) to be downsized.

A motor unit (3; 3A; 3B) of an eleventh aspect would be realized in combination with the first aspect. The twelfth aspect has the following configurations. The motor unit (3; 3A; 3B) further includes a fixed member (sensor magnet 90) fixed to an intermediate portion of the rotary shaft (51) in the axial direction D. At least part of the fixed member is located between the second portion (5212) and the rotary shaft (51).

A motor unit (3; 3A; 3B) of a twelfth aspect would be realized in combination with the first aspect. The stator (53) includes a stator core (531) and a coil (532). The stator (53) is configured such that energizing the coil (532) excites the stator core (531) to rotate the rotor (52).

An electric bicycle (1) of a thirteenth aspect includes the motor unit (3; 3A; 3B) of the eleventh or twelfth aspect and a wheel (112). Driving force of the motor (5) included in the motor unit (3; 3A; 3B) is transmitted to the wheel (111; 112).

REFERENCE SIGNS LIST

D AXIAL DIRECTION
d1 INNER DIAMETER OF FIRST PORTION d2 INNER DIAMETER OF SECOND PORTION
1 ELECTRIC BICYCLE
111 FRONT WHEEL (WHEEL)
112 REAR WHEEL (WHEEL)
3, 3A, 3B MOTOR UNIT
310 GEAR SHAFT
311 GEAR
318B GEAR
313 TEETH
5 MOTOR
51 ROTARY SHAFT
511 FIRST PROJECTION (PROJECTION)
512 SECOND PROJECTION (PROJECTION)
513 BASE END
52 ROTOR
520 RECESS
5211 FIRST PORTION
5212 SECOND PORTION
54 TEETH
551 FIRST BEARING
551A FIRST BEARING (BEARING)
552 SECOND BEARING
90 SENSOR MAGNET
90A SENSOR MAGNET
904 COUPLER (BLADE)
902 FIXING PART
902A FIXING PART

The invention claimed is:

1. A motor unit, comprising:
a motor; and
a gear,
the motor including:
   a rotary shaft;
   a rotor;
   a stator configured to rotate the rotor;
   a rotation detector configured to detect rotation position of the rotor, the rotation detector including a sensor magnet configured to rotate along with the rotary shaft and a magnetic sensor configured to detect magnetism of the sensor magnet; and
a control board disposed in a case, the control board configured to control driving of the motor,
the rotary shaft having a projection protruding from the rotor along an axial direction of the rotary shaft,
the motor further having teeth formed on an outer peripheral surface of the projection and being engaged with the gear,
the rotor having
   a first portion located around the rotary shaft and fixed to the rotary shaft, and
   a second portion located at an end of the rotor and having an inner diameter larger than an inner diameter of the first portion, the end facing the projection, and
the magnetic sensor is packaged on the control board.

2. The motor unit of claim 1, wherein
the sensor magnet has a fixing part located around a portion of the projection, the portion being located between the rotor and the teeth, and
the fixing part is fixed to the rotary shaft.

3. The motor unit of claim 2, wherein
the fixing part has at least an end facing the rotor in the axial direction, the end being located on an inner side of the second portion.

4. The motor unit of claim 2, wherein
the sensor magnet further has a blade extending in a direction transverse to a rotation direction of the sensor magnet.

5. The motor unit of claim 2, wherein
the sensor magnet is located inward from an outer peripheral edge of the rotor when viewed in the axial direction.

6. The motor unit of claim 5, further comprising a gear shaft around which the gear is provided, the gear shaft being configured to rotate along with the gear, wherein
part of the gear shaft overlaps the sensor magnet when viewed in a direction orthogonal to the axial direction.

7. The motor unit of claim 1, wherein
the rotary shaft extends through the rotor in the axial direction, and
the motor unit further includes
   a first bearing configured to rotatably support a tip end of the projection, and
   a second bearing configured to rotatably support an end of the rotary shaft, the end facing away from the projection.

8. The motor unit of claim 7, wherein
the first bearing is disposed inward from an outer peripheral edge of the second bearing when viewed in the axial direction.

9. The motor unit of claim 1, wherein
the motor unit includes a bearing configured to rotatably support a portion of the projection, the portion being located between the rotor and the teeth.

10. An electric bicycle, comprising:
the motor unit of claim 1; and
a wheel to which driving force of the motor included in the motor unit is transmitted.

* * * * *